(12) United States Patent
Sawhney et al.

(10) Patent No.: US 6,571,024 B1
(45) Date of Patent: May 27, 2003

(54) METHOD AND APPARATUS FOR MULTI-VIEW THREE DIMENSIONAL ESTIMATION

(75) Inventors: Harpreet Singh Sawhney, Cranbury, NJ (US); Rakesh Kumar, Monmouth Junction, NJ (US); Yanlin Guo, Plainsboro, NJ (US); Jane Asmuth, Princeton, NJ (US); Keith James Hanna, Princeton, NJ (US)

(73) Assignee: Sarnoff Corporation, Princeton, NJ (US)

( * ) Notice: Subject to any disclaimer, the term of this patent is extended or adjusted under 35 U.S.C. 154(b) by 0 days.

(21) Appl. No.: 09/336,319

(22) Filed: Jun. 18, 1999

(51) Int. Cl.[7] .............................. G06K 9/32; H04N 13/00
(52) U.S. Cl. ...................... 382/294; 382/284; 382/154; 348/42
(58) Field of Search ................................. 382/151, 154, 382/190, 195, 201, 203, 162, 206, 254, 274, 276, 278, 284, 285, 294, 295, 312, 296; 345/418, 419, 672, 679, 428, 629, 630, 648, 683; 348/42, 49, 50, 263, 207.99, 580

(56) References Cited

U.S. PATENT DOCUMENTS

| | | | | |
|---|---|---|---|---|
| 5,870,136 A | * | 2/1999 | Fuchs et al. | 348/42 |
| 5,963,203 A | * | 10/1999 | Goldberg et al. | 345/328 |
| 5,987,164 A | * | 11/1999 | Szeliski et al. | 382/154 |
| 6,151,009 A | * | 11/2000 | Kanade et al. | 345/113 |
| 6,297,825 B1 | * | 10/2001 | Madden et al. | 345/419 |
| 6,307,550 B1 | * | 10/2001 | Chen et al. | 345/418 |

OTHER PUBLICATIONS

C. Tomasi and T. Kanade, "Shape and Motion from Image Streams under Orthography: A Factorization Method", International Journal of computer Vision (1992), 9(2), pp. 137–154.

Torr, P. and Zisserman, A., "Robust Parameteriztion And Computation of the Trifocal Tensor", Image and Vision Computation, vol. 24 (1997), pp. 271–300.

Z. Zhang et al., "A Robust Technique for Matching Two Uncalibrated Images Through the Recovery of the Unknown Epipolar Geometry", Artificial Intelligence (1995), vol. 78, pp. 87–119.

K. Hanna, N. Okamota, "Combining Stereo and Motion Analysis for Direct Estimation of Scene Structure", Proc. Fourth Con. on Computer Vision (ICCV'93) May 1993.

P. Perona, Jitendra Malik, "Scale–Space and Edge Detection Using Anisotropic Diffusion", IEEE Transactions on Pattern Analysis and Machine Intelligence, vol. 12, No. 7, Jul. 1990, pp. 629–639.

J. Bergen, P. Anandan, K. Hanna, R. Hingorani, "Hierarchical Model–Based Motion Estimation", Proc. of European Conference on Computer Vision–92, Mar. 23, 1992.

(List continued on next page.)

Primary Examiner—Bhavesh Mehta
Assistant Examiner—Kanji Patel
(74) Attorney, Agent, or Firm—William J. Burke

(57) ABSTRACT

An apparatus and method for generating automated multi-view three dimensional pose and geometry estimation for the insertion of realistic and authentic views of synthetic objects into a real scene. A multi-view three dimensional estimation routine comprising the steps of feature tracking, pairwise camera pose estimation, computing camera pose for overlapping sequences and performing a global block adjustment to provide camera pose and scene geometric information for each frame of a scene. A match move routine may be used to insert a synthetic object into one frame of a video sequence based on the pose and geometric information of the frame, and calculate all other required object views of the synthetic object for the remaining frames using the pose and geometric information acquired as a result of the multi-view three dimensional estimation routine.

18 Claims, 11 Drawing Sheets

OTHER PUBLICATIONS

G. Adiv, "Inherent Ambiguities in Recovering 3D Information from a Noisy Flow Field", IEEE PAMI, 11(5) (1989), pp. 477–489.

O. Faugeras and R. Keriven, "Complete Dense Stereovision Using Level Set Methods", ECCV (1998), pp. 379–393.

A. Fitzgibbon and A. Zisserman, "Automatic Camera Recovery for Closed PR Open Image Sequences", in ECCV (1998), Frieburg, Germany.

R.I. Hartley, "Estimation of Relative Camera Positions for Uncalibrated Cameras", In Proc. 2nd European Conference on Computer Vision (1992), pp. 579–587.

R.I. Hartley, et al., "Triangulation", Proc. DARPA Image Understanding Workshop (1994), pp. 957–966.

R.I. Hartley, "Euclidean Reconstruction from Uncalibrated Views", In Joint European–US Workshop on Applications of Invariance in Computer Vision (1993).

R. Koch et al., "Multiviewpoint Stereo from Uncalibrated Video Sequences", in ECCV 91998), Frieburg, Germany.

B.D. Lucas and T. Kanade, "An Iterative Image Registration Technique with an Application to Stereo Vision", in Image Understanding Workshop (1981), pp. 121–130.

Sawhney, et al., "Robust Video Mosaicing Through Topology Inference And Local to Global Alignment", ECCV (1998), pp. 103–119.

S. Seitz and C. Dyer, "Photorealistic Scene Reconstruction by Voxel Coloring", in Proc. Computer Vision and Pattern Recognition Conference (1997), pp. 1067–1073.

R. Szeliski and H. Shum, "Creating Full View Panoramic Image Mosaics and Environment Maps", in Proc. of SIGGRAPH (1997), pp. 251–258.

* cited by examiner

*TABLE 1*

| SEQ. NAME | NO. OF FRAMES | MEASURE | FE | STITCH | GblMin |
|---|---|---|---|---|---|
| GARDEN | 32 | MAX | 3.429 | 0.482 | 0.262 |
| | | AVG | 0.646 | 0.188 | 0.139 |
| | | MED | 0.365 | 0.175 | 0.130 |
| DORM | 15 | MAX | 4.125 | 1.003 | 0.420 |
| | | AVG | 2.151 | 0.450 | 0.297 |
| | | MED | 2.147 | 0.330 | 0.270 |
| TERRAIN | 50 | MAX | 5.563 | 1.788 | 0.353 |
| | | AVG | 1.695 | 0.427 | 0.220 |
| | | MED | 1.656 | 0.384 | 0.212 |

METHOD AND APPARATUS FOR MULTI-VIEW THREE DIMENSIONAL ESTIMATION

The invention relates to an image processing apparatus and, more particularly, the invention relates to method and apparatus for performing three dimensional scene estimation of camera pose and scene geometry, and providing a method for the authentic insertion of a synthetic object into a real scene using the information provided by the scene estimation routine.

BACKGROUND OF THE DISCLOSURE

Seamless three dimensional insertion of synthetic objects into real scene images requires tools to allow a user to situate synthetic objects with respect to real surfaces within a scene. To facilitate the creation of a realistic image, the synthetic objects need to be projected from all the given camera viewpoints of the real scene. The current methodology for inserting a synthetic object into a real scene includes the cumbersome task of tracking and recording the camera pose and calibration for each frame of a sequence. Thus the geometry and orientation of the synthetic object to be inserted can be matched to the camera pose and calibration data for each individual frame. This process of matching geometry and orientation of the synthetic image to the individual frame pose and calibration data is repeated frame to frame in order to maintain the realistic view of the inserted object through a sequence of frames. In current practice, the pose estimation is accomplished by modeling the three dimensional background scene prior to the pose computation. This is a tedious process.

In order to automate the insertion process, it is required that object insertion be performed in as few frames as possible, preferably one, and all the other views of the object be created automatically. For placement of the object with respect to the real scene, accurate albeit limited three dimensional geometry is required, for instance, estimation of local surface patches may suffice. For stable three dimensional appearance change of the object from the given camera positions, a reliable three dimensional camera pose computation is required. Furthermore, since the graphics objects are typically created using Euclidean geometry, it is strongly desirable that the real scene and the camera pose associated with the real scene be represented using Euclidean coordinates. Stability of the pose computation over extended image sequences is required to avoid jitter and drift in the location and appearance of synthetic objects with respect to the real scene.

Therefore, a need exists in the art for a method and apparatus for estimating three dimensional pose (rotation and translation) and three dimensional structure of unmodeled scenes to facilitate the authentic insertion of synthetic objects into a real scene view.

SUMMARY OF THE INVENTION

The present invention provides an apparatus and method of estimating pose and scene structure in extended scene sequences while allowing for the insertion and authentic projection of three dimensional synthetic objects into real views. Generally, given a video sequence of N frames, the invention computes the camera pose (the rotation and translation) without knowledge of a three dimensional model representing the scene. The inventive apparatus executes a multi-view three dimensional pose and structure estimation routine comprising the steps of feature tracking, pairwise camera pose estimation, computing camera pose for overlapping sequences and performing a global block adjustment that provides camera pose and scene geometric information for each frame of a video sequence. The pairwise camera pose estimation may alternately be selected between "key" frames rather than every frame of the sequence. The "key" frames are selected from within a sequence of frames, where the "key" frames are: frames with sufficient parallax motion between the frames; frames that transition between overlapping sets of correspondences; or frames that are regularly sampled if motion within the frame sequence is smooth. A "Match Move" routine may be used to insert a synthetic object into one frame of a video sequence based on the pose and geometric information of the frame, and calculate all other required object views of the synthetic object for the remaining frames using the pose and geometric information acquired as a result of the multi-view three dimensional estimation routine. As such, the synthetic object is inserted into the scene and appears as a "real" object within the imaged scene.

BRIEF DESCRIPTION OF THE DRAWINGS

The teachings of the present invention can be readily understood by considering the following detailed description in conjunction with the accompanying drawings, in which.

To facilitate understanding, identical reference numerals have been used, where possible, to designate identical elements that are common to the figures.

DETAILED DESCRIPTION

Figure 1:
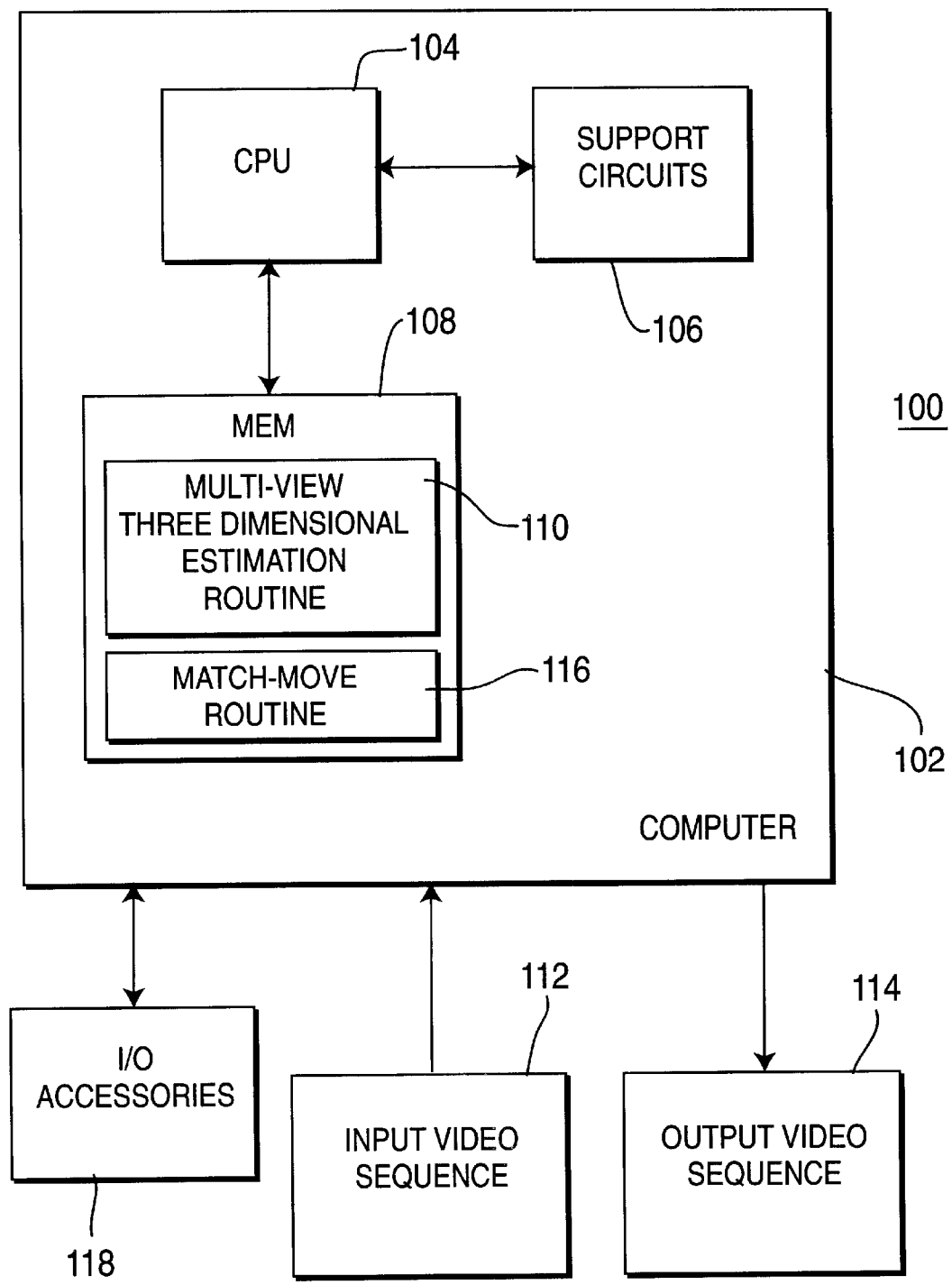
FIG. 1 depicts a block diagram of an imaging apparatus incorporating the image analysis method and apparatus of the invention.

FIG. 1 depicts a three dimensional multi-view estimation apparatus 100 of the present invention. An input video sequence 112 is supplied to a computer 102 that is comprised of a central processing unit (CPU) 104, support circuits 106, and memory 108. Residing within the memory 108 is a multi-view three dimensional pose and structure estimation routine 110 and a match move routine 116. The multi-view three dimensional estimation routine 110 and the match move routine 116 may alternately be readable from another source such as a floppy disk, CD, remote memory source or via a network. The computer 102 additionally is coupled to input/output accessories 118. As a brief description of operation, an input video sequence 112 is supplied to the computer 102, which, after operation of the multi-view three dimensional estimation routine 110, outputs an output video sequence 114. The output sequence 114 contains processed subsequences of frames from the input video sequence that form a long sequence that has been adjusted using a pose estimation to accurately combine the subsequences. If the insertion of a synthetic object into a real scene is desired, the match move routine 116 uses the result of the multi-view three dimensional estimation routine 110 to create the output video sequence 114 containing a plurality of input sequences plus a synthetic object.

Figure 2:
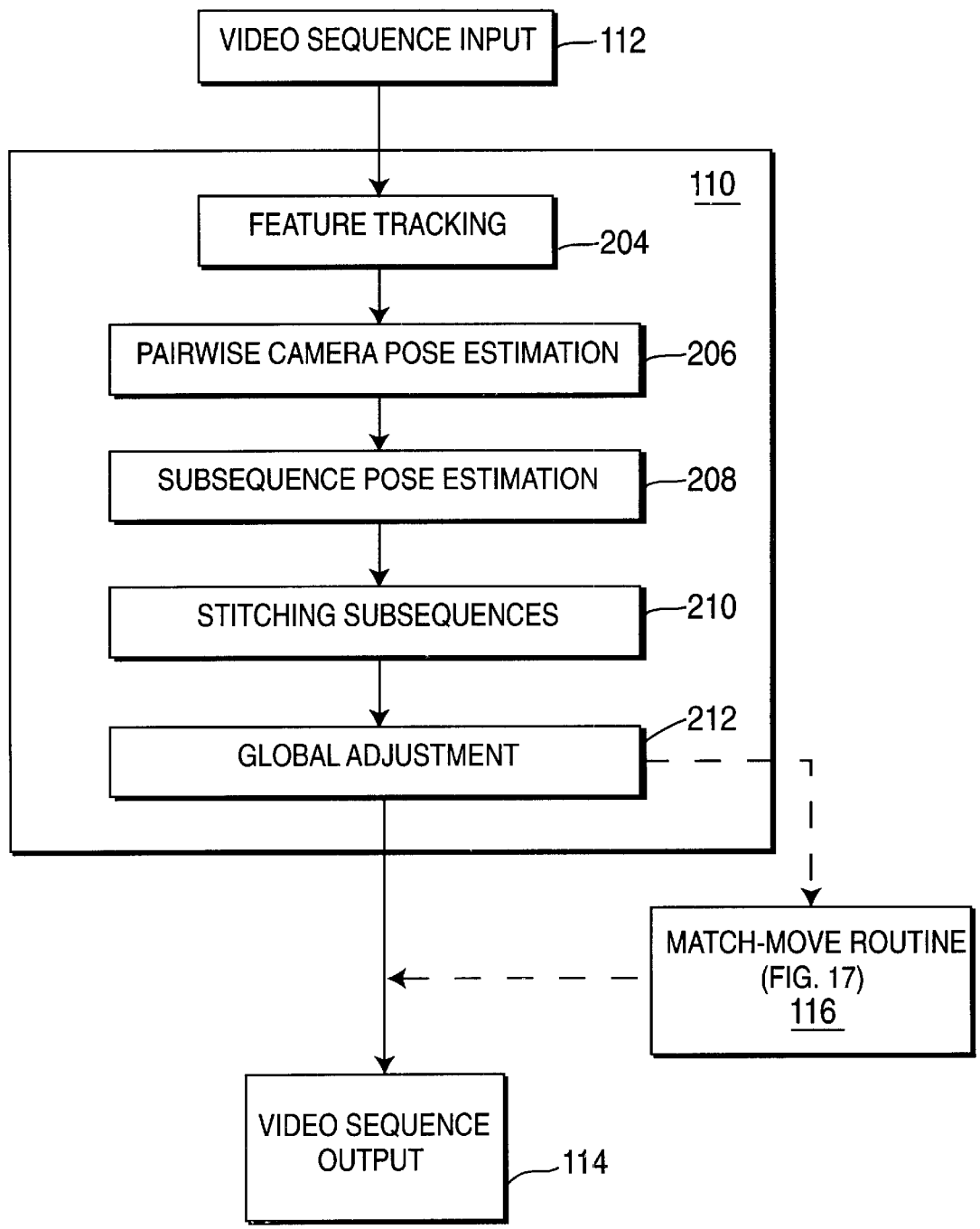
FIG. 2 is a flow chart of a first embodiment for the image analysis method of the invention used to estimate three dimensional pose and structure of an unmodeled scene.

FIG. 2 is a flow diagram of a first embodiment for the multi-view three dimensional estimation routine 110 for estimating pose and structure in extended scene sequences while allowing for the insertion and authentic projection of three dimensional synthetic objects into real views. FIG. 2 depicts the flow diagram of an input video sequence or subsequences 112 through the multi-view three dimensional estimation routine 110 to yield a output video sequence 114. The multi-view three dimensional estimation routine 110 is illustrated as a series of procedures beginning with feature tracking 204 followed by pairwise camera pose estimation 206, subsequence pose estimation 208, stitching subsequences 210, respectively terminating in a global adjustment 212 of the stitched subsequences. If the insertion of a synthetic object is desired, the match move routine 116 is performed after the global adjustment 212 to obtain the output video sequence 114 containing an accurate combination of the image subsequences.

Figure 3:
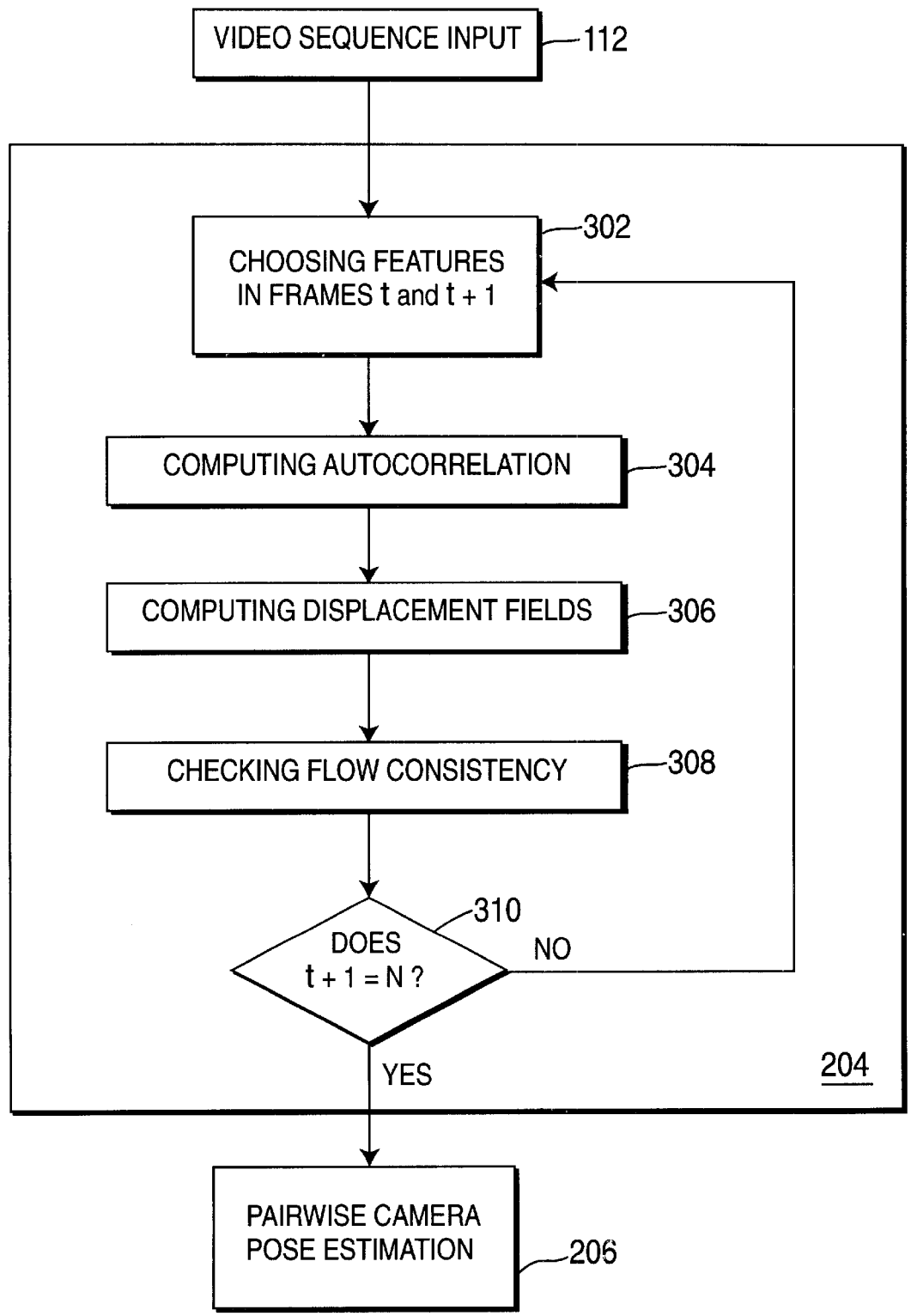
FIG. 3 is a flow chart of the tracking procedure.

The feature tracking procedure 204 is detailed in FIG. 3. The feature tracking procedure 204 uses the frame-to-frame coherence of the input video sequence 112 having N frames for establishing good correspondences between pairs of frames. Since an assumption of the presence of specific structures in each frame the input video sequence 112 cannot be relied upon, and the ability to handle fairly arbitrary three dimensional motions are desired, a series of steps are executed to choose and track features within the frame sequence. The first step 302 selects features in frame set t and t+1. The frame set (or pair of frames) may be any pair of frames in a frame sequence. For example, the frames could be sequential or selected from the frame sequence as "key frames". The key frames are: frames with sufficient parallax motion between the frames; frames that transition between overlapping sets of correspondences; or frames that are regularly sampled if motion within the frame sequence is smooth. Features are chosen on the basis of their contrast strength and distinctiveness with respect to their local pixel neighborhoods. The distinctiveness property is useful for selecting features in scenes where there may be a lot of repetitive structures and hence establishing unique correspondences may be a problem.

Salient point features are selected as centers of image patches whose auto-correlation surface satisfies a number of properties at a few different scales. Step 304 computes the auto-correlation surfaces at those locations where the average gradient magnitude within a window is above a chosen threshold (typically chosen to be 10.0). At each scale (level) in a Gaussian pyramid, the auto-correlation surface must satisfy the following properties: (i) it should be approximated well by a quadratic surface, (ii) it should be concave downwards, (iii) the minimum curvature magnitude should be above a threshold, and (iv) the ratio of the larger to the smaller curvature should be above a threshold. Checking these properties at a number of given scales ensures that high contrast points that are locally distinctive are selected. The specific thresholds used to select the initial feature points are not very critical since a number of processing stages are used to prune and further constrain good features to track.

In every new frame feature points are initialized as above and the features from a previous frame are projected into the new frame. Since neither the camera pose nor the three dimensional location of the features is known, both forward and reverse displacement fields are computed between pair t and t+1 of frames in step 306. The displacement field is computed using a multi-resolution coarse-to-fine optic-flow algorithm disclosed in Bergen, et al., "Hierarchical Model-based Motion Estimation", Proc. $2^{nd}$ European Conference on Computer Vision (1992), pp. 237–252, or it may also be computed by constraining the displacements to lie on epipolar lines using a small-motion three dimensional model disclosed in Hanna, et al., "Combining Stereo And Motion Analysis For Direct Estimation Of Scene Structure", Proc. Intl. Conf. on Computer Vision Workshop (1993), pp. 357–365. The forward and backward displacement vectors are used to check for flow consistency at a point within the frame. That is, a point is considered desirable for feature tracking if its predicted location using the forward and backward flow projection is consistent. That is, point $p_t$ is flow consistent if $\delta(p_t)=\|p_{pred}-p_t\|\leq\epsilon$, where $p_{pred}=p^+ + ub_{t+1}(p^+)$, $p^+=p_t+uf_t(p_t)$, $p^+$ is the forward projection of $p_t$ into the frame t+1 using the forward displacement field $uf_t$, and $p_{pred}$ is the backward projection of $p^+$ into frame t using the backward displacement field $ub_{t+1}$. Note that $ub_{t+1}(p^+)$ is an interpolated vector since $p^+$ may not in general lie on a grid location.

In any given frame, both new points and points projected from a previous frame are checked for flow consistency at their locations in step 308. Only points that are flow consistent are kept for further tracking from frame to frame. In step 310, the routine checks if t+1=N. If t+1<N, the process of steps 302, 304, 306 and 308 are repeated for the next incremental frame pair ($t_t$ and $t_t+1$). Once t+1=N, the pairwise camera pose estimation procedure 206 is performed.

As mentioned above, another method for feature tracking 204 is the use of key frames. Key frames are selected as frames with sufficient parallax motion between frames, as frames that transition between overlapping sets of correspondences, or frames that are regularly sampled if the motion within the frame sequence is smooth.

Figure 4:
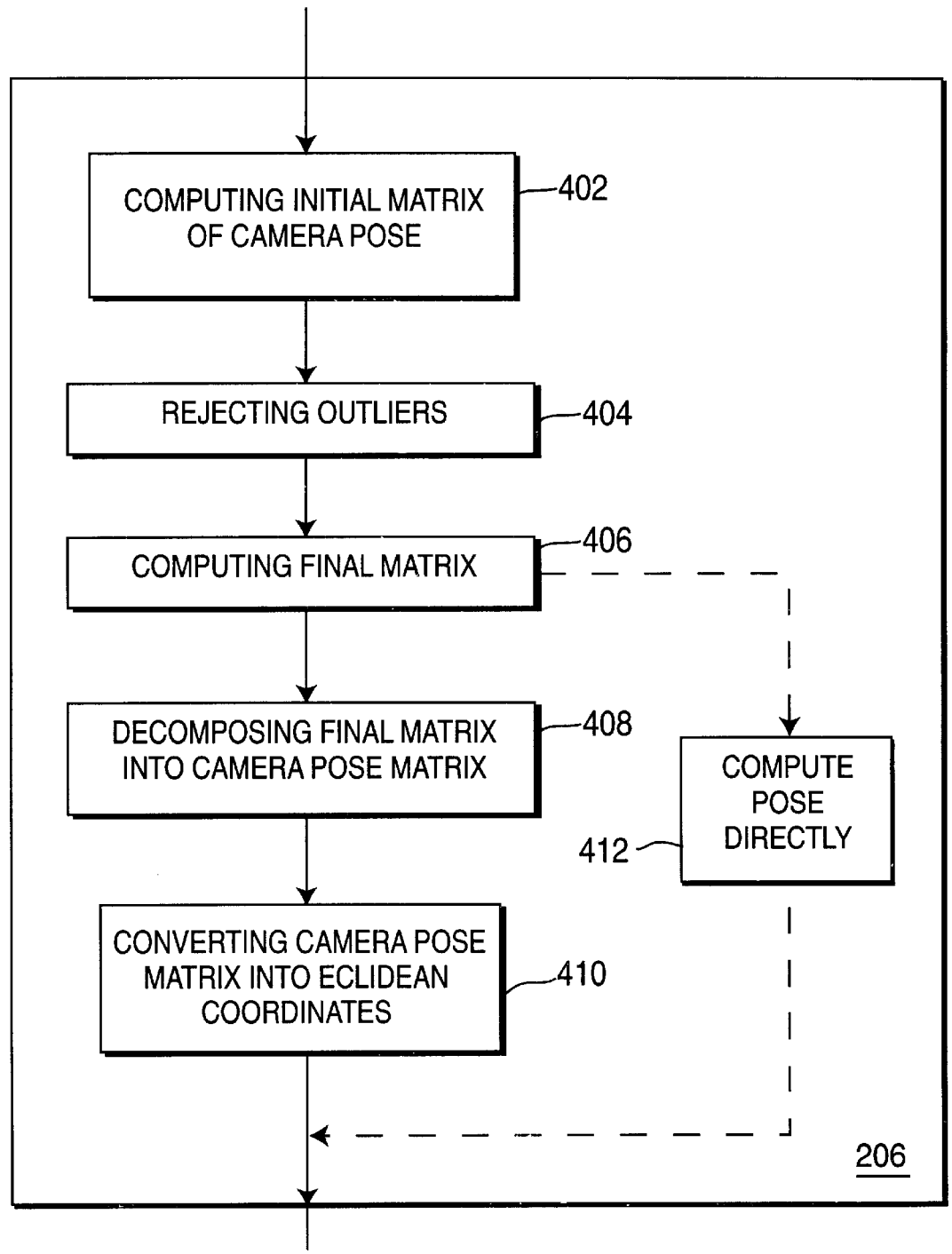
FIG. 4 is a flow chart of the pairwise camera pose estimation procedure.

Pairwise camera pose estimation 206 is described in greater detail in FIG. 4. Pairwise camera pose estimation 206 begins with step 402 where the initial estimates for the camera pose are computed using the fundamental matrix constraint disclosed in Hartley, et al., "Triangulation", Proc. DARPA Image Understanding Workshop (1994), pp. 957–966. The tri-focal constraint may also be used disclosed in Torr, P. and Zisserman, A., "Robust Parameterization And Computation of the Trifocal Tensor", Image and Vision Computation, Vol. 24 (1997), pp. 271–300. Given a point $P_w$ in some world coordinate system, its projection in the fth frame can be written as:

$$p_f = AM_f P_w \qquad (1)$$

where $A=[[f_x\ 0\ 0]^T [0\ f_y\ 0]^T [c_x\ c_y\ 1]^T]$, is the camera calibration matrix with the scale factors and center coordinates in image pixels.

$$M_f = \begin{bmatrix} R_f & T_f \\ 0 & 1 \end{bmatrix},$$

is the 3×4 camera projection matrix with the rotation and translation for frame f.

Given point correspondences between a pair of frames, it is well known that the two frame projections constraint is captured by the fundamental matrix constraint: $p_f^T F p_{f+1} = 0$. The fundamental matrix can be computed by a number of known techniques.

In the subsequent step 404, outliers are rejected from the fundamental matrix using a least median squares minimization. After the outlier rejection of step 404, the final F matrix is computed in step 406 using the image based error measure after outlier rejection.

With the knowledge of the approximately known camera calibration, the F matrix can be decomposed into the camera pose matrices $M_f$ using a technique described in R. I. Hartley, "Estimation of Relative Camera Positions for Uncalibrated Cameras", Proc. 2$^{nd}$ European Conference on Computer Vision, Pages 579–587, 1992. Note that in principal, using multiple frames and projective camera matrices, the self-calibration techniques also could be employed. However, first, the stability of these techniques under arbitrary three dimensional motions is not guaranteed, and second, in practice, the only internal camera parameter that needs adjustment beyond the roughly known parameters is the focal length or scale. Aspect ratio, skew and the principal point are either generally known or nominal parameters are adequate. The final step 410 in pairwise camera pose estimation 206 assumes standard values for aspect ratio, skew and principal point and uses a rough initial guess of the focal length to convert from projective camera matrices to Euclidean coordinates. The focal length parameter is adjusted further in the maximum-likelihood stage that is chosen to be some factor of the image.

Alternately, the pairwise camera pose estimation 206 may be accomplished by executing a step 412 in place of steps 408 and 410. Step 412 directly computes the Euclidean pose from the final F matrix of step 406.

In order to exploit a static rigid scene constraint, the pairwise camera estimates of procedure 206 are used to create consistent camera pose estimates and the corresponding three dimensional point locations over short subsequences in the subsequence pose estimation procedure 208. The advantage of dividing video sequence into subsequence estimates is threefold: (i) better computational efficiency since global bundle block adjustment for all frames is expensive, (ii) progressively better generation of estimates leading to a global maximum likelihood estimation, and (iii) limited build up of error due to small scale concatenation of local pose estimates. Subsequence pose estimation 208 is described in greater detail in FIG. 5.

Subsequence pose estimation 208 begins with step 502 which creates a subsequence from the output of the pairwise camera pose estimation process 206. Point tracks that persist for the time period of each subsequence are used to create the consistent estimates. For a subsequence 0 to s, say 0 is chosen as the reference frame. The pairwise camera estimation is performed for each pair 0–f with f≦s. Therefore, for each subsequence the camera transformations benefit from varying baseline between pairs of frames. For subsequence processing, the pairwise estimates first need to be represented consistently in the fth frame's coordinate system. This can be achieved by solving for an unknown scale factor for each frame. That is $P_f = R_f P_0 + \alpha_f T_f$ where $P_0$ and $\alpha_f$ are the unknowns, $P_0$'s are the three dimensional points in the 0th frame and $\alpha_f$ is the scale factor for the fth frame in the subsequence. One of the $\alpha$'s is arbitrarily set to unity. The rest of the scale factors and all the three dimensional points can be solved by minimizing the image projection errors or the triangulation errors. Essentially the sum of image reprojection errors, $E = \Sigma_n \Sigma_f \| p_{f,n} - \Pi(P_{f,n}) \|^2$, is minimized over all three dimensional points and frames indexed by n and f, respectively, using iterative least squares ($\Sigma$ is the three dimensional to two dimensional projection operator). The output of this process is a collection of consistent camera poses and a set of reconstructed three dimensional points all of which are visible in the subsequence 0 to s.

However, the poses obtained above are not optimal since only the overall scale factors have been adjusted in the optimization process. In order to compute the maximum likelihood estimates for the camera pose and three dimensional points for the subsequence, a bundle block adjustment is applied in step 504 to optimize the subsequence. The following maximum likelihood criterion is minimized:

$$E = \sum_f \sum_n \left\| \frac{p_{0,n}^{(3)} - T_f}{\|p_{0,n}^{(3)} - T_f\|} - R_f \cdot \frac{p_{f,n}^{(3)}}{\|p_{f,n}^{(3)}\|} \right\|^2$$

Essentially the three dimensional points $P_{0,n}$ are projected as unit vectors in the fth frame, and the corresponding observed image points, $P_{f,n}$ are also represented as unit vectors. The error measure is the distance between the two unit vectors summed over all the three dimensional points and frames (including the reference frame) indexed by n and f, respectively. The advantage of this representation is that the images could each be a spherical mosaic representation. The unit vector representations can handle both planar and wide angle projections. The calibrations parameters also are folded into the image vector, $P_{f,n}$ as in Eqn. 1. Therefore, the scale factor and other parameters can be adjusted within the same optimization.

Bundle block adjustment exploits the nice block structure that the system of normal equations has for the above sum of squares problem. The LHS matrix looks like:

$$\begin{bmatrix} M_1 & & 0 & N_{11} & \cdots & N_{1,P} \\ & \ddots & & \vdots & \ddots & \vdots \\ 0 & & M_{F-1} & N_{F-1,1} & & N_{F-1,P} \\ N_{11}^T & \cdots & N_{F-1,P}^T & S_1 & \cdots & 0 \\ \vdots & \ddots & \vdots & & \ddots & \\ N_{1,P}^T & \cdots & N_{F-1,P}^T & 0 & & S_P \end{bmatrix}$$

The $M_f$'s are the Hessian matrices (with the standard approximation for a sum-of-squares problem) with respect to the fth camera parameters, and thus represent the summation over all the points visible in frame f, Likewise, $S_n$'s are the Hessians with respect to the nth three dimensional point and are summed over all the frames in which that point is visible. The off-diagonal blocks, $N_{f,n}$ matrices corresponding to the cross derivatives with respect to the fth frame and the nth three dimensional point. Furthermore, the incremental solution for the three dimensional points can be analytically computed in terms of the solutions of the camera parameters. Therefore, by back-substitution, one never has to store the full k*(F–1)+3*P matrix where k are the camera parameters per frame, F is the number of frames, and P is the number of points.

The process of creating a subsequence 502 and optimizing the subsequence is checked at step 506 to ensure that the entire sequence obtained from the pairwise pose estimation process 206 is processed into subsequences. Portions of the sequence from the pairwise pose estimation process 206 which have not undergone steps 502 and 504 are looped back though steps 502 and 504 by step 508 until a string of subsequences is passed on to the stitching process 210.

Figure 5:
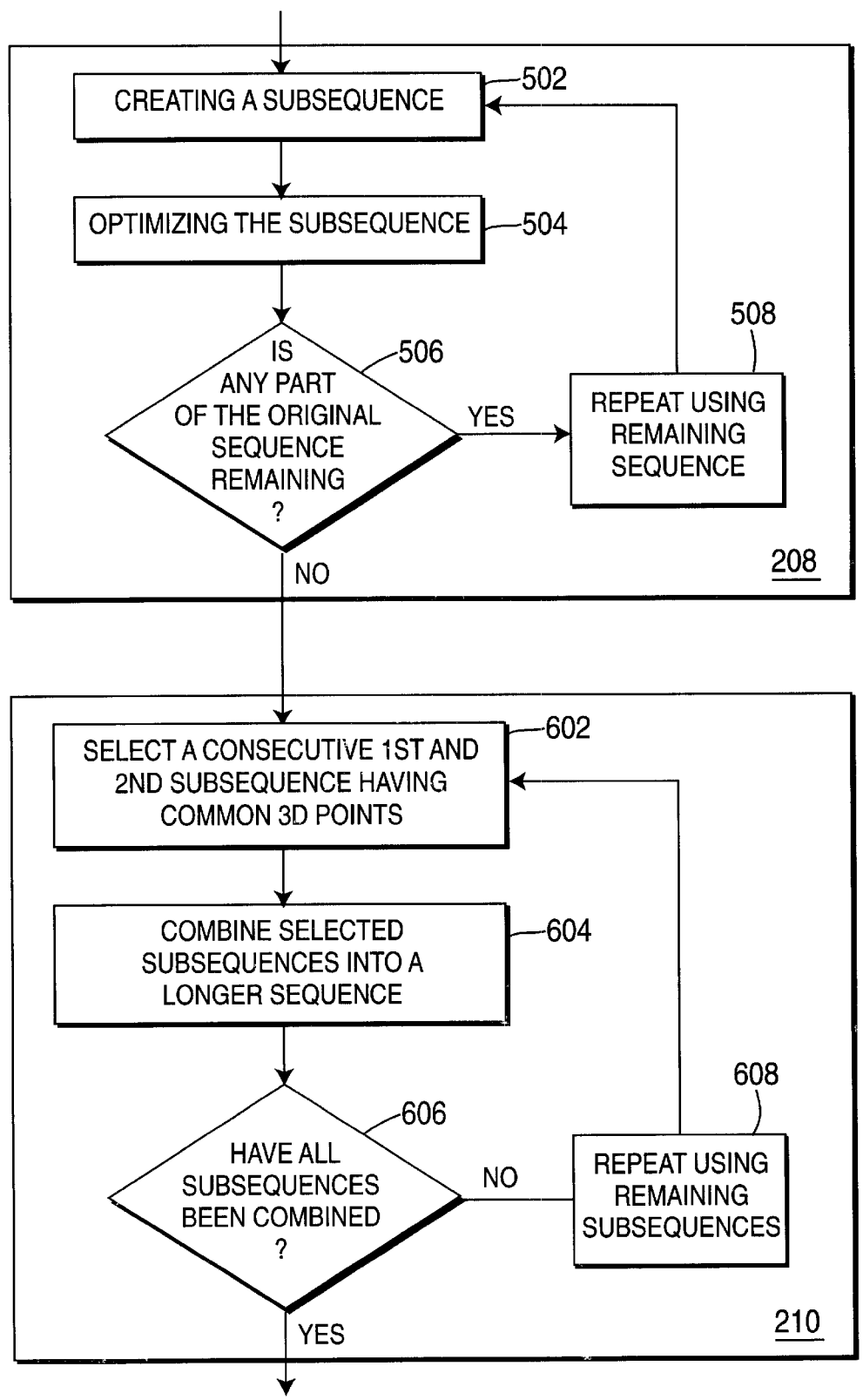
FIG. 5 is a flow chart of the subsequence pose estimation procedure and the stitching procedure.

The stitching process 210, also detailed in FIG. 5, begins with step 602 which performs a subsequence computation to select a few frames which overlap between consecutive subsequences. Step 604 takes the points that are visible in two overlapping subsequences and uses them to combine the subsequences to represent both the subsequences in a common coordinate system. A common three dimensional point has two different representations in two subsequences: $P_{s1}$ and $P_{s2}$ but the same image frame is used in the two subsequences. Then the image projection can be written in two ways in Eqn. 1, one with the camera matrix with the pose $\{R_1 T_1\}$ and the other with the pose $\{R_2 T_2\}$. Therefor, there is a similarity transformation corresponding to $\{s,R,T\}$ such that the two three dimensional representations of each point and the two camera representations of the same frame are identical. That is, from Eqn. 1, $M_{s1} = M_{s2} S^{-1}$, and $[P_{s1} 1]^T = S[P_{s2} 1]^T$. The unknown similarity transformation S is computed by minimizing an image based error measure:

$$\sum_n d^2(p_{n,} \Pi(M_{s1} S[P_{s2,n} 1]^T)) + d^2(p_{n,} \Pi(M_{s2} S^{-1} [P_{s1,n} 1]^T))$$

The steps 606 and 608 function to repeat the steps 602 and 604 until all of the subsequences obtained from the subsequence pose estimation procedure 208 are recombined into a single sequence and are ready for the global adjustment procedure 212.

The stitching subsequences procedure 210 allows the representation of pose and the three dimensional points in a single coordinate system. However, point tracks that are common across more than one subsequence provide constrains for further global adjustment of the three dimensional parameters. In the final global adjustment procedure 212, bundle block adjustment as described for subsequence pose estimation procedure 208, is applied to the complete set of frames and three dimensional points. For computational efficiency, this adjustment can be applied in small sets of arbitrary frames or can be applied to the complete set. The interesting aspect of the representation here is that any combination of internal parameters, pose parameters or three dimensional points can be adjusted while maintaining a global representation.

The performance of this approach is shown both quantitatively and in terms of the visual stability of three dimensional object insertion. Three video sequences that are representative of three different types of motions that may be used in three dimensional model acquisition and in video post-production type applications. The first has motion mostly in the view direction ($T_z$) with rotations and change of motion, the second is a fixation type motion, and the third is almost pure translatory motion parallel ($T_y$) to the image plane simulating an aerial platform. For quantitative results, the reprojection errors (the difference in pixels in the location of a projected three dimensional point and its measured image location) were compared for each frame at various stages of processing. The processing stages are abbreviated as: (i) FE: the stage, called the FrontEnd, at which the pairwise camera estimates with respect to a reference in a sub-sequence are combined using a common scale factor, (ii) Stitch: where the overlapping sub-sequences are stitched together and represented in a consistent coordinate system using similarity transformations, and (iii) Gbl Min : the final global adjustment that combines all the three dimensional point and pose estimates in one optimization. For each of the three video sequences, plots of the average errors for each frame over all the visible points in that frame are shown.

Figure 6:
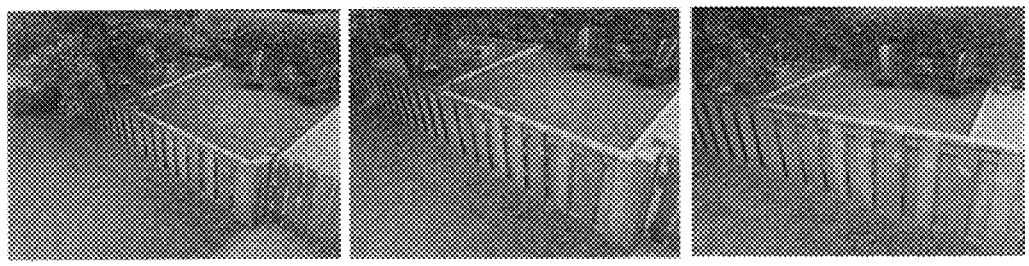
FIG. 6 shows three frames (1, 21, 32) of a 32 frame "garden" sequence.

The first sequence, called garden, is a sequence of 97 frames that are sub-sampled by 3 to create a sequence of length 32. The size of each frame is 1024×768. The field of view is about 45° and the camera moves first mostly along the view axis and then turns sideways. Three frames of the sequence (frames 1, 21, and 32 ) are shown in FIG. 6. (There are some markers put on the fence but these markers were not used for feature tracking.) It is to be emphasized that there are not many visually distinctive features in this sequence. Using the auto-correlation and flow-based tracker, a total of 757 points were tracked over the 32 frames with the number per frame ranging from 200 to 30. After outlier removal, finally, 732 points were used for the global adjustment.

Figure 9:
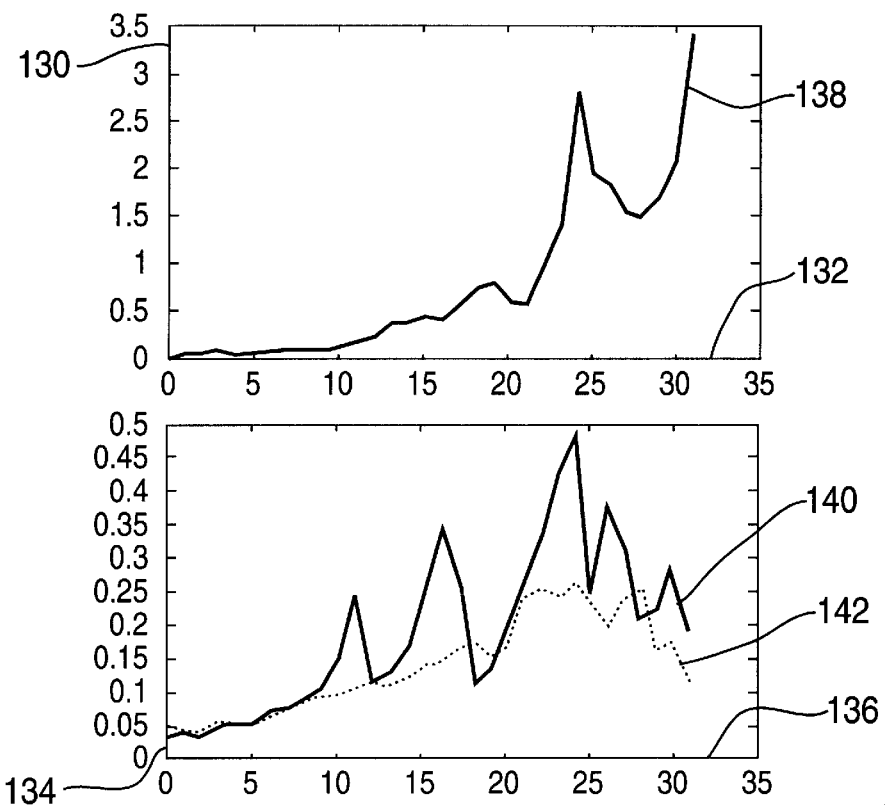
FIG. 9 shows the average the Front End, Stitch and Global Minimization error distribution over the 32 frames of the "garden" sequence for the three processing stages.

The distribution of the average reprojection error distribution over the 32 frames of the garden sequence for the processing steps 208, 210, and 212 are shown in FIG. 9. The axis 130 and axis 134 represents the error while axis 132 and axis 136 represents the frame number. Plot 138 is the average FE error, plot 140 represented by a solid line is the average Stitch error, and the plot 142 represented by a dotted line is thee average Gib Min error.

The highlight of the results is the progressive reduction in reprojection errors. Consider the mean error in each frame. The maximum value of the mean error per frame reduces from 3.429 pixels after final matrix computation to 0.482 pixels after stitch, and further to 0.262 after global minimization. Likewise, the mean of the mean errors per frame goes down from 0.646 pixels to 0.188 pixels and finally to 0.139 pixels.

Figure 13:
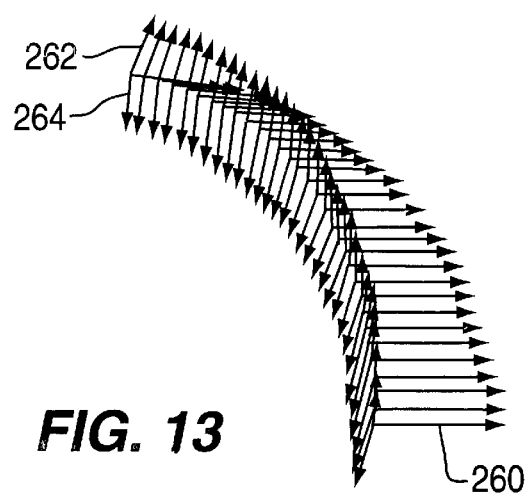
FIG. 13 depicts pose estimates computed by the invention for the garden sequence.

The pose estimates that are computed by the invention for the garden sequence are depicted as camera coordinates in VRML are shown in FIG. 13. The x axis is denoted by 260, the y axis is denoted by 264, and the z axis is denoted by 262.

Figure 7:
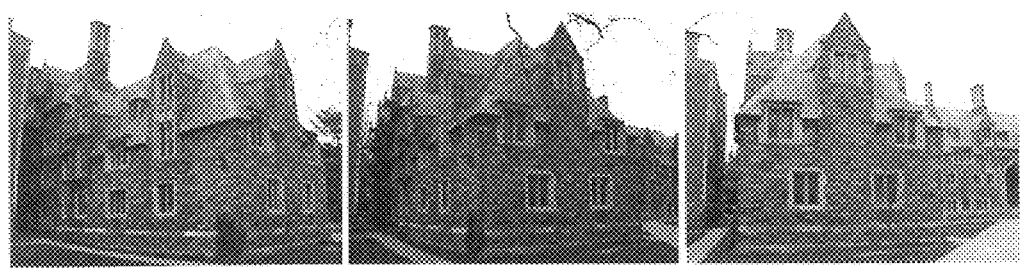
FIG. 7 shows three frames (1, 8, 15) of a 15 frame "dorm" sequence.

The second sequence is a 15-frame sequence of a university dormitory (dorm) that was captured as 640×480 frames using a digital camera. The camera field of view was about 50°. Three frames of the sequence (frames 1, 8, and 15) are shown in FIG. 7. The camera was moved around the building to keep the building in view and hence this is an example of a fixation like sequence, the type of sequence that is considered ideal for model acquisition. A total of 431 points were tracked with points in each frame ranging from 81 to 241. Again, the maximum value of the mean error per frame reduces from 4.125 pixels after final matrix computation to 1.003 after stitch, and further to 0.420 pixels after global minimization. Likewise, the mean of the mean errors per frame goes down from 2.008 pixels to 0.450 and finally to 0.297 pixels.

Figure 10:
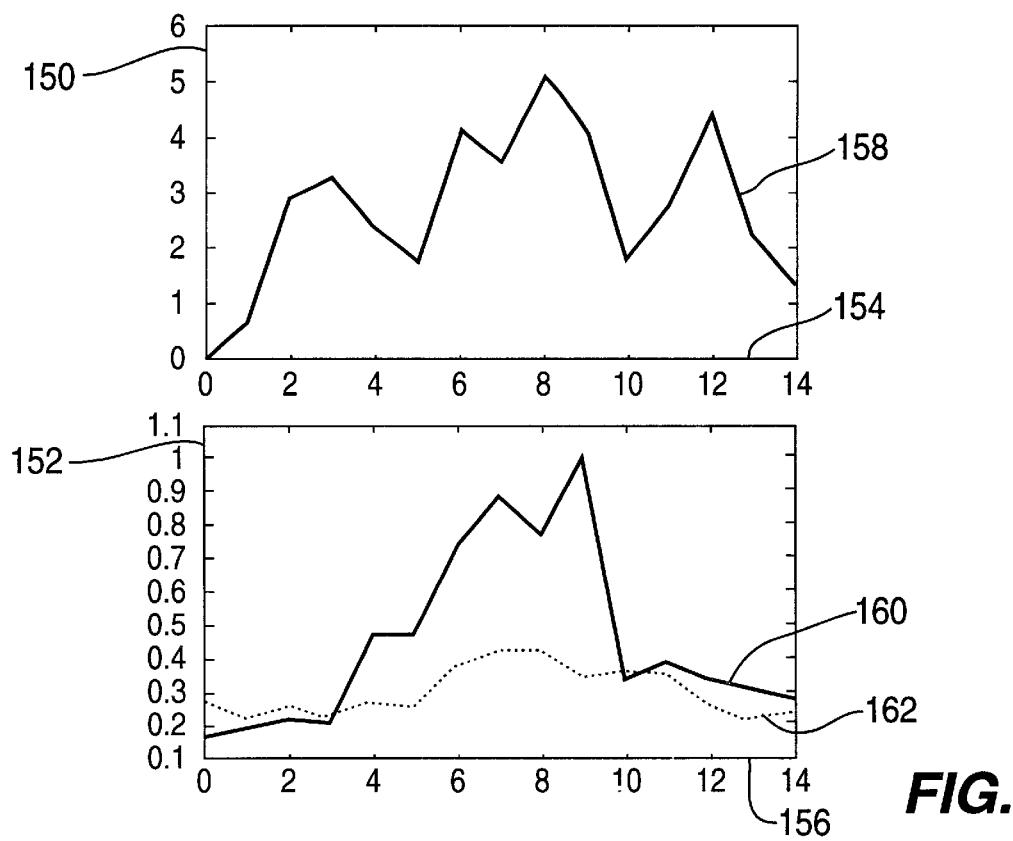
FIG. 10 shows the average Front End, Stitch and Global Minimization error distribution over the 15 frames of the "dorm" sequence for the three processing stages.

The distribution of the average reprojection error distribution over the 15 frames of the dorm sequence for the processing steps 208, 210, and 212 are shown in FIG. 10. The axis 150 and axis 152 represents the error, while axis 154 and axis 156 represents the frame number. Plot 158 is the average FE error, plot 160 represented, by a solid line is the average Stitch error, and the plot 162 represented by a dotted line is the average Glb Min error.

Figure 12:
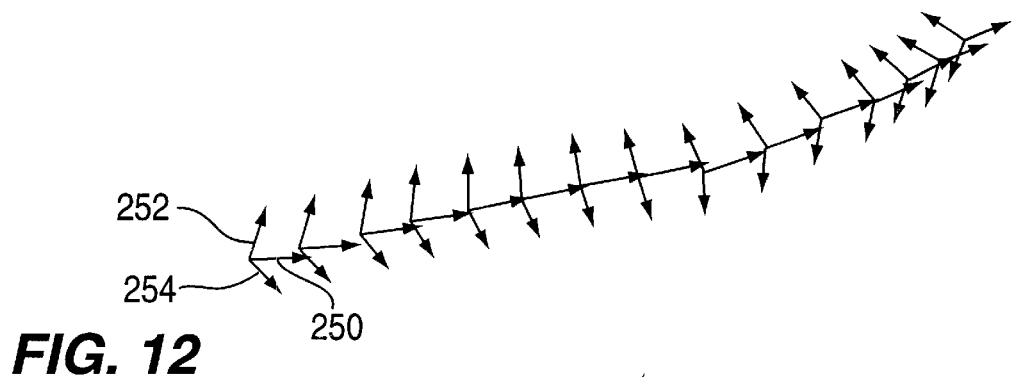
FIG. 12 depicts pose estimates computed by the invention for the dorm sequence.

The pose estimates that are computed by the invention for the dorm sequence are depicted as camera coordinates in VRML are shown in FIG. 12. The x axis is denoted by 250, the y axis is denoted by 254, and the z axis is denoted by 252.

Figure 8:
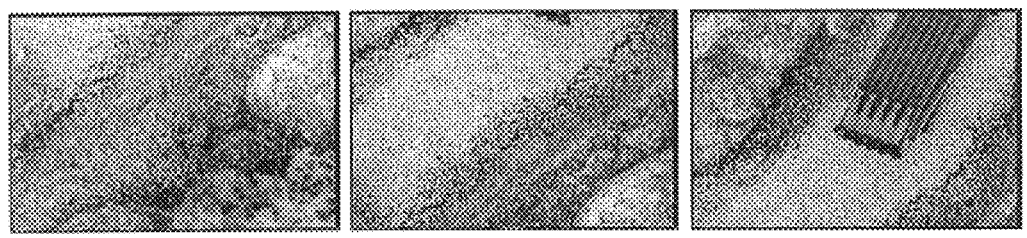
FIG. 8 shows three frames (1, 11, 21) of a 50 frame "terrain" sequence.

The third sequence is a 50-frame sequence of a terrain model captured using a camcorder attached to a gantry to simulate aerial motion. The camera was zoomed in so that the field of view was only about 10°. Unfortunately, the gantry set up is only able to move the camera but not provide any pose information. The video was digitized to 320×240 frames and was temporally sampled by 4. Therefore the effective length of the sequence is 200 frames. Three frames of the sequence (frames 1, 11, and 21) are shown in FIG. 8. As before, a maximum error averaged over all the 50 frame of 5.563 pixels after final matrix computation reduces to 1.788 pixels after stitch and to 0.353 pixels after global minimization. The mean of the average frame errors for the three stages processing are 1.661, 0.427 and 0.220 pixels respectively.

Figure 11:
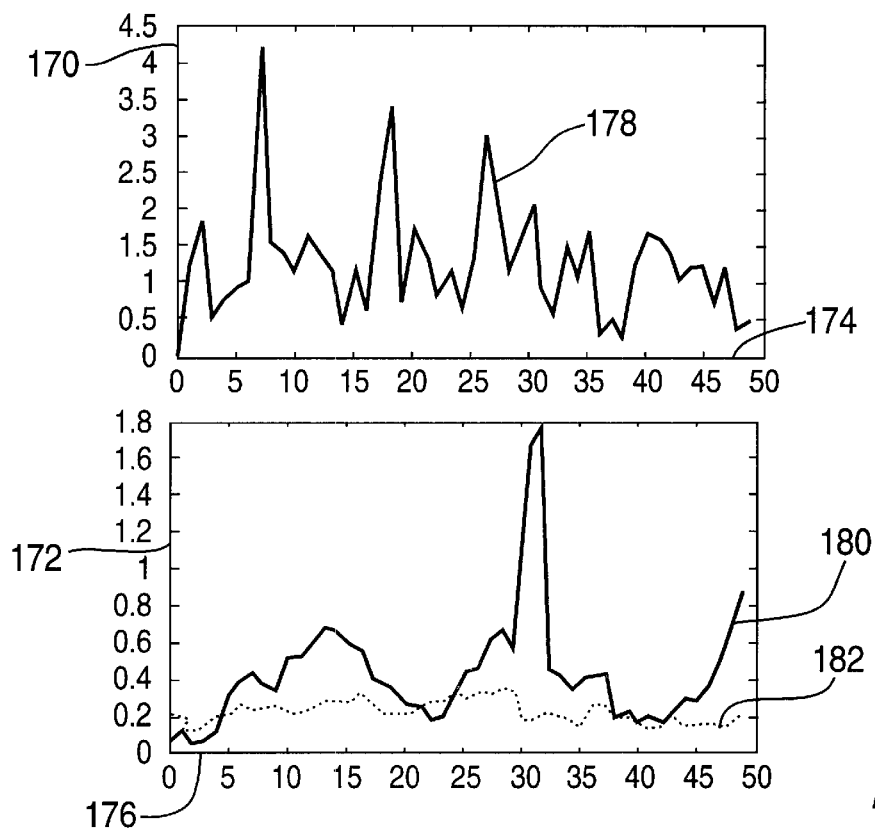
FIG. 11 shows the average Front End, Stitch and Global Minimization error distribution over the 50 frames of the "terrain" sequence for the three processing stages.

The distribution of the average reprojection error distribution over the 50 frames of the terrain sequence for the processing steps 208, 210, and 212 are shown in FIG. 11. The axis 170 and axis 172 represents the error, while axis 174 and axis 176 represents the frame number. Plot 178 is the average FE error, plot 180 represented by a solid line is the average Stitch error, and the plot 182 represented by a dotted line is the average Glb Min error.

It is well known that two-frame estimates in such an imaging situation suffer from an ambiguity between rotations and the depth scale (and translation), the bas-relief ambiguity. However, the effective field of view is enhanced by our multi-frame tracking and local-to-global optimization strategy, and hence reliable results are obtained even in this situation.

Figure 16:
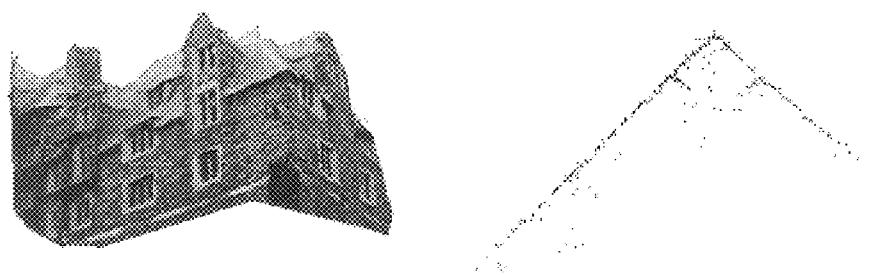
FIG. 16 depicts a VRML generated view of the texture mapped model of the dorm and the top view of the point cloud that is reconstructed.

The maximum, average and median errors for the average errors over all the frames for the three sequences are summarized in Table 1:

To emphasize that not only is the three dimensional pose of the camera computed, but the tracked set of points are also accurately reconstructed, FIG. 16 is provided as an example of texture mapped model. FIG. 16 shows a VRML generated view of the texture mapped model of the dorm and the top view of the point cloud that is reconstructed. The texture mapping is accomplished by defining triangles over one reference image. Note that both three dimensional poses and points are recovered well.

Figure 17:
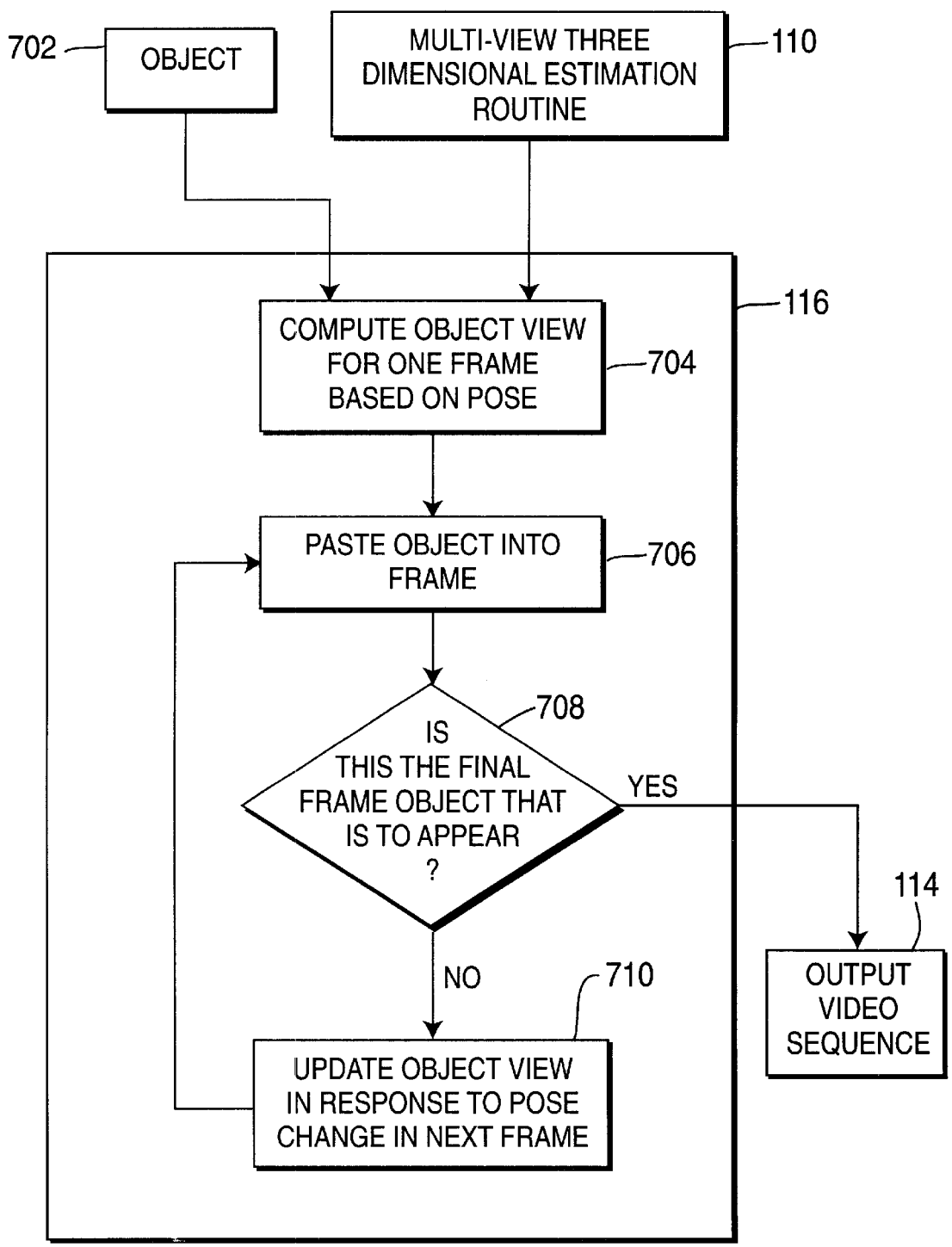
FIG. 17 is a flow chart of the match move method of the invention used to insert a synthetic object into an unmodeled scene.

Accurate and stable pose estimation important for the application of three dimensional match move in which synthetic objects are inserted into real images and their viewpoints are mimicked according to the real camera's pose and internal parameters. The match move routine 116 is employed when desired after the global adjustment procedure 212. The match move routine 116 is detailed in FIG. 17.

To initiate the match move routine 116, a synthetic object 702 and camera pose in the coordinate system developed by the multi-view estimation routine 110 must be supplied. The step 704 computes the object view for the synthetic object 702 based on the camera pose information obtained from the multi-view estimation routine 110 for the frame into which the synthetic object 702 is to be inserted. The synthetic object 702 is then inserted (or pasted) into the frame in step 706 based on the object view for that frame. Step 708 determines if the synthetic object 706 is to appear in the next frame. If the synthetic object 702 is to appear in the next frame, the object view for the next frame is updated in step 710 and the steps of pasting object view 706 and determining 708 if the synthetic object 702 is in subsequent frames is repeated. If the synthetic object 702 is not to be present in the next frame, the match move routine is finished resulting in the output video sequence 114.

The effects of the match move routine 116 on the output video sequence 114 are depicted with the illustrations below.

Figure 14:
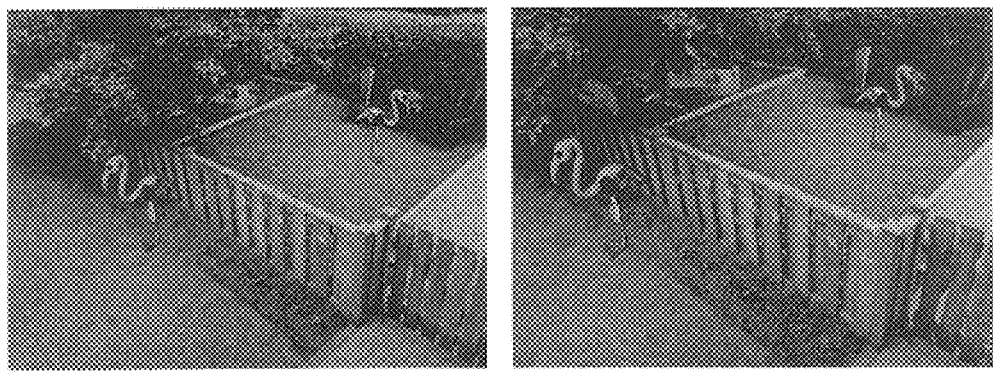
FIG. 14 depicts two frames of the Garden sequence in which some synthetic objects have been inserted.

FIG. 14 shows two original frames of the Garden sequence in which some synthetic objects have been inserted. The object was inserted in the three dimensional coordinates of the scene points of the first camera frame created by the algorithm and in the coordinate system developed by the multi-view estimation routine 110 of one camera. In order to situate the object precisely some local surface modeling was performed using the three dimensional estimates obtained. Once the synthetic object was placed with respect to the real surface in the reference frame, all other views of the object are created using editing software and the computed camera transformations. Editing software, such as OpenInventor, is available from SGI.

Figure 15:
FIG. 15 depicts two original frames of the Dorm sequence in which some synthetic objects have been inserted.

A similar insertion for the Dorm sequence is shown in FIG. 15. It is to be emphasized that in both the data sets, the placement of the synthetic images has been accomplished with respect to one frame only and that too with respect to the three dimensional surface computed by the algorithm. Therefore, there is minimal interaction demanded of the user. It is to be emphasized that both in the still image displays as well as in the videos, no drift or jitter in the objects in any of the frames is noticeable. This is a qualitative visual validation of the stability of pose and three dimensional structure computation of the algorithm developed.

Figure 18:
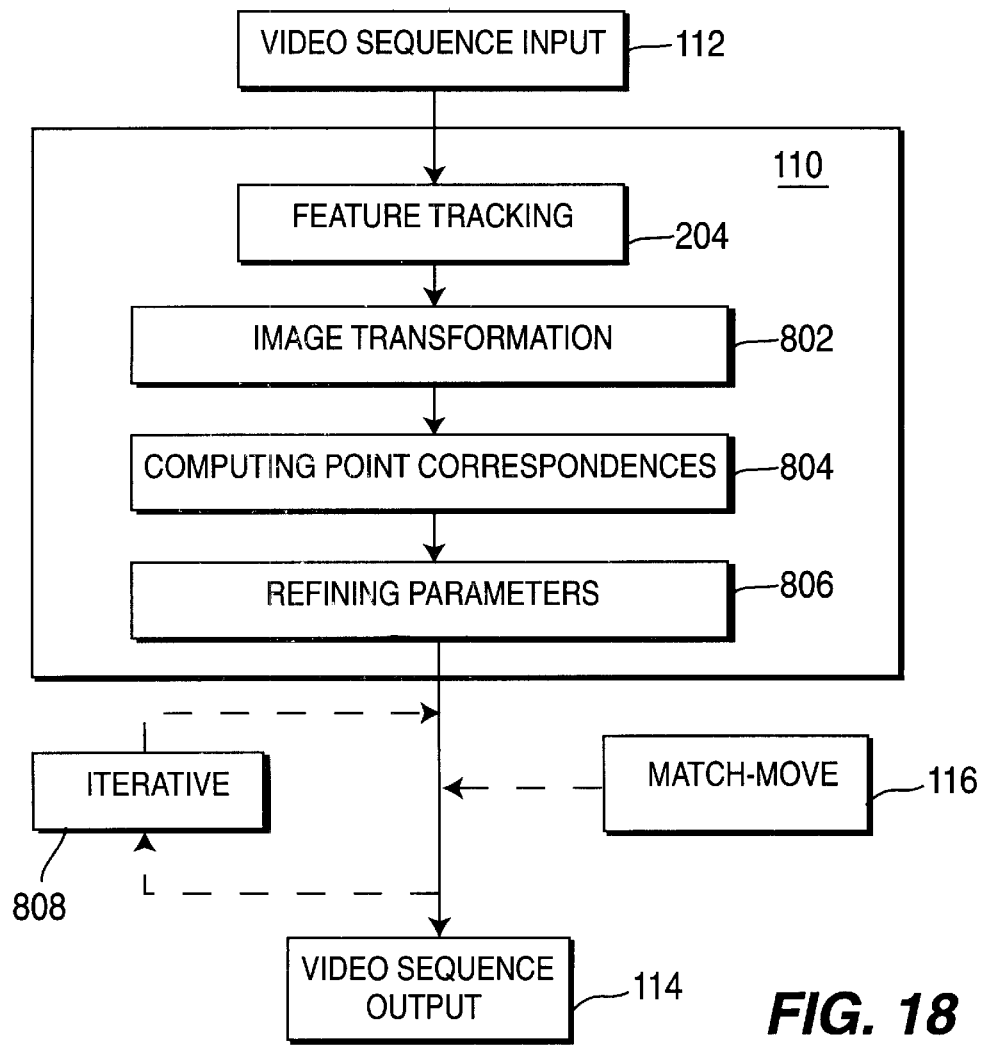
FIG. 18 is a flow chart of a second embodiment for the image analysis method of the invention used to estimate three dimensional pose and structure of an unmodeled scene; and Table 1 is a summary of maximum and average errors over all the frames after the three stages of processing for three sequences.

FIG. 18 depicts a second embodiment of the multi-view three dimensional estimation routine 110. The second embodiment of multi-view three dimensional estimation routine 110 is particularly useful when the reference imagery and the current imagery is significantly different or does not contain a significant number of image features. Since the camera parameters can be itteratively resolved and refined, creating accurate estimations, the second embodiment of the multi-view three dimensional estimation routine 110 achieves excellent results from a single frame. First the feature tracking step 204 is performed (step 204 is described above with respect to FIG. 3). Next, in step 802, an approximate transform between the current and reference imagery is provided by a separate coarse search module, by ESD (Engineering Support Data) or by an initialization algorithm. The output of the frame-to-frame processing is the transformation between successive current images. These are fed into a global minimization algorithm disclosed in Sawhney, et al., "Robust Video Mosaicing Through Topology Inference And Local to Global Alignment", ECCV (1998), pp. 103–119, that minimizes the error between virtual points that are created using the frame to frame parameters and the coarse search parameters to recover an estimate of the transform between each of the current images and the reference imagery.

The next step 804 uses the image matches between the current and reference imagery at each frame to improve accuracy. This is performed by computing point correspondences using a hierarchical flow algorithm, see Bergen, et al., pp. 237–252. To compensate for the algorithm assuming brightness consistency, the images are pre-filtered with Laplacian filters in order to reduce the impact of illumination changes. The algorithm computes local matches at every image pixel, first at course resolution, then refining the matches at finer resolutions.

These point matches are then sampled and, together with the frame to frame parameters, are processed by the global minimization algorithm in step 806, see Sawhney, et al., pp. 103–119. The result is a set of refined parameters for each frame. These parameters are then used to warp or shift the reference imagery to each current image in the match move step 116. Point matches between the warped reference imagery and the current imagery can be re-computed iteratively in step 808 to refine the model parameters to a greater level.

Although the embodiment which incorporate the teachings of the present invention have been shown and described in detail herein, those skilled in the art can readily devise many other varied embodiments that still incorporate these teachings.

What is claimed is:

1. A method for camera pose estimation comprising:
   (a) tracking features from frame-to-frame in a video sequence;
   (b) estimating pairwise camera poses for frame pairs having overlapping features within said video sequence;
   (c) computing camera poses for overlapping subsequences within said video sequence based on the pairwise camera pose estimates;
   (d) combining said overlapping subsequences to form longer sequences having a consistent coordinate system using camera pose consistency across the overlapping subsequences; and
   (e) performing a global adjustment to the longer sequences to produce final camera pose estimates for said longer sequences.

2. The method of claim 1 further comprising:
   (f) inserting a synthetic object using the final camera pose estimates to create an authentic projection of said synthetic object in the video sequence.

3. The method of claim 1 further wherein the tracking step further comprises:
   (g) selecting new features in every frame in a sequence having frames $T_N$;
   (h) computing an auto-correlation surface for said selected features;
   (i) computing displacement fields for said auto-correlation surfaces of said selected features of said frames $T_0$ to $T_{t+1}$;
   (j) checking flow consistency for said auto-correlation surfaces of said selected features of said frames $T_0$ to $T_{t+1}$;
   (k) keeping said auto-correlation surfaces of said selected features which are consistent for future tracking;
   (l) repeating steps (h), (i) and (j); and
   (m) keeping consistent features for future tracking until N=l+1.

4. The method of claim 1 wherein the tracking step further comprises selecting a plurality of key frames for performing tracking.

5. The method of claim 4 wherein the key frames are selected as frames with sufficient parallax motion between frames, as frames that transition between overlapping sets of correspondences, or frames that are regularly sampled if the motion from frame-to-frame is smooth.

6. The method of claim 1 wherein the step of estimating pairwise camera poses comprises:
   (b1) computing an initial matrix of camera poses;
   (b2) rejecting outliers of said initial matrix;
   (b3) computing a final matrix of camera poses using an image based error measurement;
   (b4) decomposing said final matrix into a camera pose matrix; and
   (b5) converting said camera pose matrix into Euclidean coordinates.

7. The method of claim 1 wherein the step of estimating pairwise camera poses comprises:
   (b6) computing an initial matrix of camera poses;
   (b7) rejecting outliers of said initial matrix;
   (b8) computing a final matrix of camera poses using image based error measurement;
   (b9) computing Euclidean pose coordinates.

8. The method of claim 1 wherein the step of computing camera poses for overlapping subsequences comprises:
   creating subsequences having consistent camera poses; and
   optimizing the subsequences by applying a bundle block adjustment to each subsequence.

9. Apparatus for performing camera pose estimation comprising:
   means for frame-to-frame tracking of features within a video sequence;
   means for pairwise estimating camera poses from frame pairs within said video sequence having overlapping features;
   means for computing camera poses for overlapping subsequences within said video sequence using the pairwise camera pose estimates as initial estimates; and
   means for performing a global bundle block adjustment to compute final camera pose estimates.

10. The apparatus of claim 9 further comprising:
   means for representing longer sequences in a consistent coordinate system using camera pose consistency across the overlapping subsequences.

11. The apparatus of claim 9 further comprising:
   means for inserting a synthetic object into a frame of said video sequence where the orientation and geometry of said synthetic object is based on said computed camera pose for said frame.

12. The apparatus of claim 11 further comprising:
   means for placing said synthetic object in a plurality of frames in said video sequence, orienting and sizing said placed synthetic object based upon said inserted frame.

13. A computer-readable medium having stored thereon a plurality of instructions, the plurality of instructions including instructions which, when executed by a processor, cause the processor to perform a method for camera pose estimation comprising:
   (a) tracking features from frame-to-frame in a video sequence;
   (b) estimating pairwise camera poses for frame pairs having overlapping features within said video sequence;
   (c) computing camera poses for overlapping subsequences within said video sequence using the pairwise camera pose estimates as initial estimates;
   (d) combining said overlapping subsequences to form longer sequences having a consistent coordinate system using camera pose consistency across the overlapping subsequences; and
   (e) performing a global adjustment to the longer sequences to produce final camera pose estimates for said longer sequences.

14. The computer-readable medium of claim 13 further comprising:
   (f) inserting a synthetic object using the final camera pose estimates to create an authentic projection of said synthetic object in the video sequence.

15. The computer-readable medium of claim 13 wherein the step of tracking comprises:
   (g) selecting new features in every frame in a sequence having frames $T_N$;
   (h) computing an auto-correlation surface for said selected features;
   (i) computing displacement fields for said auto-correlation surfaces of said selected features of said frames $T_0$ to $T_{t+1}$;
   (j) checking flow consistency for said auto-correlation surfaces of said selected features of said frames $T_0$ to $T_{t+1}$;
   (k) keeping said auto-correlation surfaces of said selected features which are consistent for future tracking;
   (l) repeating steps (h), (i) and (j); and
   (m) keeping consistent features for future tracking until N=t+1.

16. The computer-readable medium of claim 15 further comprising selecting a plurality of key frames for performing tracking, wherein the key frames are selected as frames with sufficient parallax motion between frames, as frames that transition between overlapping sets of correspondences, or frames that are regularly sampled if the motion from frame-to-frame is smooth.

17. The computer-readable medium of claim 13 wherein the step of estimating pairwise camera poses comprises:
   (b1) computing an initial matrix of camera poses;
   (b2) rejecting outliers of said initial matrix;
   (b3) computing a final matrix of camera poses using an image based error measurement;
   (b4) decomposing said final matrix into a camera pose matrix; and
   (b5) converting said camera pose matrix into Euclidean coordinates.

18. The computer-readable medium of claim 13 wherein the step of computing camera poses for overlapping sequences comprises:
   creating subsequences having consistent camera poses; and
   optimizing the subsequences by applying a bundle block adjustment to each subsequence.

* * * * *